United States Patent
Kwatra

(10) Patent No.: US 8,670,630 B1
(45) Date of Patent: Mar. 11, 2014

(54) FAST RANDOMIZED MULTI-SCALE ENERGY MINIMIZATION FOR IMAGE PROCESSING

(75) Inventor: Vivek Kwatra, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 224 days.

(21) Appl. No.: 13/308,836

(22) Filed: Dec. 1, 2011

Related U.S. Application Data

(60) Provisional application No. 61/421,602, filed on Dec. 9, 2010.

(51) Int. Cl.
G06K 9/40 (2006.01)

(52) U.S. Cl.
USPC ........... 382/254; 382/260; 382/275; 382/299; 358/1.2; 358/3.26; 358/3.27

(58) Field of Classification Search
USPC ........... 382/254, 260, 274, 275, 299; 358/1.2, 358/3.26, 3.27, 463
See application file for complete search history.

(56) References Cited

U.S. PATENT DOCUMENTS

| | | | |
|---|---|---|---|
| 6,630,950 B1 * | 10/2003 | Ohkawara et al. | 348/208.12 |
| 6,750,974 B2 * | 6/2004 | Svetkoff et al. | 356/602 |
| 6,987,544 B2 * | 1/2006 | Ogata et al. | 348/678 |
| 6,993,167 B1 * | 1/2006 | Skladnev et al. | 382/128 |
| 7,026,830 B2 * | 4/2006 | Shinada et al. | 324/754.22 |
| 7,102,662 B2 * | 9/2006 | Iida | 347/237 |
| 7,440,610 B1 * | 10/2008 | Wirtz et al. | 382/154 |
| 7,463,816 B2 * | 12/2008 | Tseng et al. | 386/353 |
| 7,616,885 B2 | 11/2009 | Chen et al. | |
| 7,805,011 B2 * | 9/2010 | Klamer et al. | 382/232 |
| 8,350,932 B2 * | 1/2013 | Iwasaki et al. | 348/240.99 |
| 2005/0285874 A1 | 12/2005 | Zitnick et al. | |
| 2005/0285875 A1 | 12/2005 | Kang et al. | |
| 2005/0286759 A1 | 12/2005 | Zitnick et al. | |
| 2007/0024614 A1 | 2/2007 | Tam et al. | |
| 2007/0071311 A1 | 3/2007 | Rovira-Mas et al. | |
| 2008/0031327 A1 | 2/2008 | Wang et al. | |
| 2013/0250123 A1 | 9/2013 | Zhang et al. | |

OTHER PUBLICATIONS

Barnes, C., et al., "PatchMatch: A Randomized Correspondence Algorithm for Structural Image Editing," ACM Transactions on Graphics (Proc. SIGGRAPH), Aug. 2009, 10 pages.

Google, "Google building maker" 2011, 1 page [online][retrieved on May 31, 2012] Retrieved from the internet <URL:http://sketchup.google.com/3dwh/buildingmaker.html>.

* cited by examiner

*Primary Examiner* — Yosef Kassa
(74) *Attorney, Agent, or Firm* — Fenwick & West LLP

(57) ABSTRACT

An image processing module performs efficient image enhancement according to a multi-scale energy minimization process. One or more input images are progressively downsampled to generate a pyramid of downsampled images of varying resolution. Starting with the coarsest downsampled image, a label map is generated that maps output pixel positions to pixel positions in the downsampled input images. The label map is then progressively upsampled. At each upsampling stage, the labels are refined according to an energy function configured to produce the desired enhancements. Using the multi-scale energy minimization, the image processing module enhances image via hole-filling and/or super-resolution.

38 Claims, 10 Drawing Sheets

FAST RANDOMIZED MULTI-SCALE ENERGY MINIMIZATION FOR IMAGE PROCESSING

CROSS-REFERENCE TO RELATED APPLICATION

This application claims the benefit of U.S. Provisional Application No. 61/421,602 entitled "Fast Randomized Multi-Scale Energy Minimization for Image Processing" filed on Dec. 9, 2010, which is incorporated by reference herein in its entirety.

This application is related to U.S. patent application Ser. No. 13/309,125 entitled "Fast Randomized Multi-Scale Energy Minimization for Inferring Depth from Stereo Image Pairs" to Vivek Kwatra filed on Dec. 1, 2011, which is incorporated by reference herein in its entirety.

BACKGROUND

1. Field of the Invention

This invention generally relates to image processing and more specifically to enhancing images.

2. Description of the Related Art

Many current information systems store large quantities of digital images. However, the available digital images are often low quality images, resulting in a low-quality viewing experience for users of the systems. For example, map applications often provide views of the surrounding area for a given map location and contain many images of streets and buildings, sometimes obtained from multiple sources, such as aerial and ground photos. Such images may be taken from a large distance, thereby providing broad coverage, but resulting in a lack of the resolution needed to provide a user with fine detail. Furthermore, these images often include "holes," i.e., missing or obscured portions of the object or scene depicted in the image. As a result, these systems provide users with image data of less than desirable quality.

Some image processing systems apply optimization techniques to automatically enhance images, thereby improving quality of the available image data. However, traditional techniques are very slow. Thus, there is a need for faster ways to perform image enhancement.

SUMMARY

A first embodiment comprises a method for enhancing an image. A low resolution version of the one or more input images is generated. A low resolution label map (corresponding to an intermediate processing stage) is generated corresponding to the low resolution versions of the one or more input images. Each label in the low resolution label map corresponds to an output pixel position and each label points to a pixel position in the low resolution version of the one or more input images. An output label map corresponding to a high resolution output image is initialized using initial labels determined based on the low resolution label map. The output label map is refined to minimize an energy function. The high resolution output image is generated by copying pixels from the one or more input images according to the output label map. The high resolution output image is stored to a storage medium.

A second embodiment comprises a non-transitory computer-readable storage medium storing computer executable computer program instructions for enhancing an image. The computer program instructions comprise instructions for generating a low resolution version of the one or more input images is generated. A low resolution label map is generated corresponding to the low resolution versions of the one or more input images. Each label in the low resolution label map corresponds to an output pixel position and each label points to a pixel position in the low resolution version of the one or more input images. An output label map corresponding to a high resolution output image is initialized using initial labels determined based on the low resolution label map. The output label map is refined to minimize an energy function. The high resolution output image is generated by copying pixels from the one or more input images according to the output label map. The high resolution output image is stored to a storage medium.

A third embodiment comprises a computer system for enhancing an image. The computer system includes a computer-readable storage medium storing executable computer program instructions. The computer program instructions comprise instructions for generating a low resolution version of the one or more input images is generated. A low resolution label map is generated corresponding to the low resolution versions of the one or more input images. Each label in the low resolution label map corresponds to an output pixel position and each label points to a pixel position in the low resolution version of the one or more input images. An output label map corresponding to a high resolution output image is initialized using initial labels determined based on the low resolution label map. The output label map is refined to minimize an energy function. The high resolution output image is generated by copying pixels from the one or more input images according to the output label map. The high resolution output image is stored to a storage medium. The computer system further comprises a processor configured to execute the computer program instructions stored on the computer-readable storage medium.

The figures depict embodiments for purposes of illustration only. One skilled in the art will readily recognize from the following description that alternative embodiments of the structures and methods illustrated herein may be employed without departing from the principles described herein.

DETAILED DESCRIPTION

Figure 1:
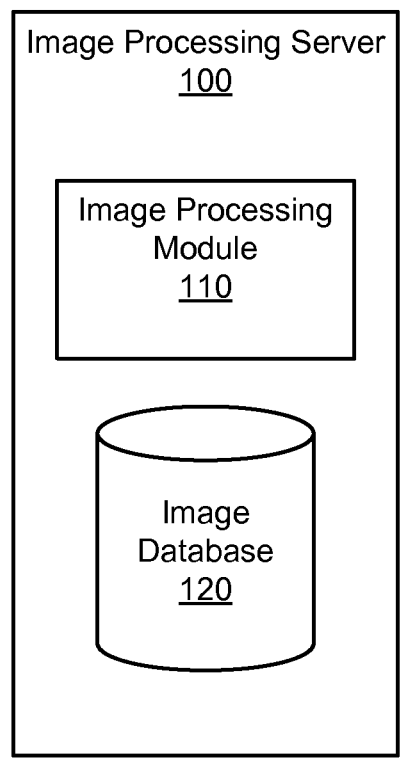
FIG. 1 is a high-level block diagram of an image processing server according to one embodiment.

FIG. 1 is a high-level block diagram of an image processing server 100 according to one embodiment. The server 100 includes an image processing module 110 and an image database 120. Only one server 100, image processing module 110, and image database 120 are shown in FIG. 1 in order to simplify and clarify the description. Embodiments can have multiple ones of these entities. Moreover, the entities can be distributed across multiple machines. For example, the image processing module 110 and database 120 can be distributed across multiple servers.

The image database 120 stores a set of images. The term "image" as employed herein includes image data in general, such as individual still image files or frames from a video file. An image I comprises a two-dimensional array of pixels. A particular pixel $I(x,y)$ may be defined differently depending on the color space and encoding format. For example, in a RGB color space, a pixel may be defined as $I(x,y)=\{R, G, B\}$, where R, G, and B are the intensity values of red, green, and blue respectively.

In one embodiment, the images in the image database 120 may be obtained from a variety of sources. In one particular embodiment, the images are obtained from an organization that produces aerial or street view images of a portion of a city for use with a map system, such as GOOGLE MAPS, GOOGLE STREET VIEW or GOOGLE EARTH. Likewise, images (including video frames) may be obtained from users, e.g. as submitted by a user uploading images to a photo repository such as PICASA WEB, or a video repository such as YOUTUBE or GOOGLE VIDEO.

Typically, these images vary in image quality depending on the locations from where the images were taken, the hardware used to capture the images, the fields of view shown by the images, the weather when the images were captured, the times of day that the images were captured, and other factors. As a result, the images in the image database 120 may include undesirable characteristics such as holes (portions of the image that are missing or obscured) resulting from how the images were captured and/or processed. In addition, some images may have lower resolution than is desired for the intended uses of the images.

The image database 120 may also store enhanced versions of the images. The enhanced version of an image lacks one or more of the undesirable characteristics present in the original image. For example, an enhanced version of an image having a hole (e.g., an occluded portion of an object depicted in the image) lacks the hole. Likewise, an enhanced version of an image having low resolution has increased resolution.

The image processing module 110 processes the original unenhanced images in the image database 120 to produce enhanced versions of the images. In one embodiment, the image processing module 110 performs image enhancement using a labeling approach. In this approach, the image processing module 110 generates the enhanced output image by creating a label map that maps each pixel location in an enhanced output image to a pixel location in one or more input images (e.g., from the image database 120). For example, in one embodiment, a label map L comprises a two-dimensional array of labels where each label is defined as $L_{a,b}=(x,y)$ where $(a, b)$ is a location of a pixel in the output image and $(x, y)$ is a location of a pixel in an input image. Alternatively, to construct an output image based on a plurality of different input images, the label may comprise a triplet $L_{a,b}=(i, x, y)$ where i is an index identifying one of the input image. The image processing module 110 then synthesizes the output image by copying the pixel values (e.g., RGB color values) from the designated input image pixel locations to the output image according to the labels. Thus, for example, the output image comprises a two-dimensional array of pixels such that a pixel in the output image I' is given by $I'(a,b)=I(L_{a,b})=I(x,y)$. The image processing chooses the labels such that they minimize an energy (cost) function defined on an image that is configured to achieve the desired enhancement. Examples of energy functions for various applications will be described in further detail below.

Figure 2:
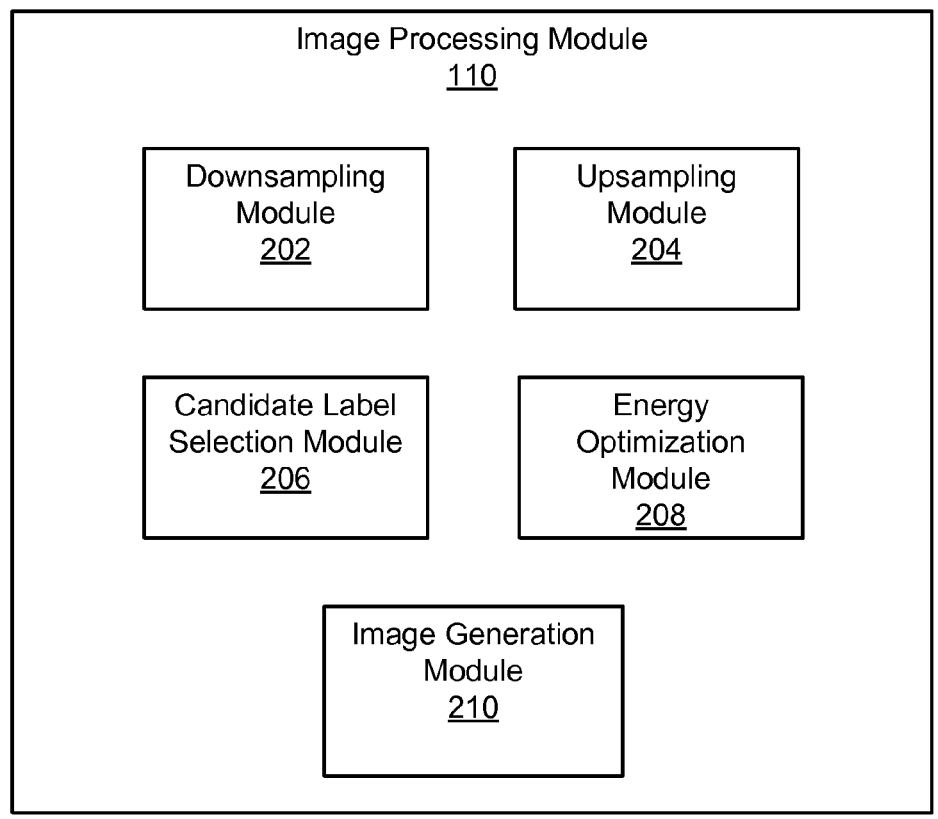
FIG. 2 is a block diagram of an image processing module according to one embodiment.

FIG. 2 is a block diagram of an example embodiment of the image processing module 110. The image processing module 110 comprises a downsampling module 202, an upsampling module 204, a candidate label selection module 206, an energy optimization module 208, and an image generation module 210. Alternative embodiments of the image processing module 110 have different and/or additional modules than the ones described here. Similarly, the functions can be distributed among the modules in a different manner than is described here.

The downsampling module 202 performs downsampling of an image to generate a lower resolution version of the image. In one embodiment, the downsampling module 202 further applies filtering to downsampled images in order to provide a smoother appearance to the downsampled image. The upsampling module 204 upsamples images to generate a higher resolution version of the image. In upsampling, an interpolation filter adds additional pixels to an image and infers their values in a manner that is visually consistent. In one embodiment, the upsampling module 204 upsamples label maps instead of operating directly on the images. In this embodiment, the upsampling module 204 generates a higher resolution label map from a lower resolution label map and infers the label values based on the energy function.

The downsampling module 202 and upsampling module 204 may be utilized in a multi-scale process to enables fast minimization of the energy function for the enhanced output image. In the multi-scale process, the downsampling module 202 first progressively downsamples input images to create a plurality of images of varying resolution. The upsampling module 202 then progressively generates label maps for each downsampled image beginning with the coarsest image. At each stage, the label map is initialized based on the labels from the previous lower resolution label map, and then iteratively refined to further improve the energy function. The multi-scale minimization process will be described in further detail below with reference to FIGS. 6-7.

The candidate label selection module 206 applies various techniques to choose a set of candidate labels for each pixel position in the label map. The candidate label selection module 206 may determine candidate labels based on, for example, spatial proximity, pixel (color) similarity, and/or a randomized function. The particular criteria applied to select candidate labels may vary depending on the type of enhancement being performed. The energy optimization module 208 applies an energy function to choose the candidate label from the set of candidate labels that best minimizes the energy function. Specific techniques for finding candidate labels and selecting candidate labels to minimize an energy function are described in further detail below.

The image generation module 210 generates an output image by copying pixels from the one or more input images according to the label map. The output image is an enhanced version of the input image.

The image processing server 100 can be utilized to enhance images in variety of different ways. By utilizing different energy functions, the image processing server 100 can enhance different characteristics of an input image to generate an enhanced output image. For example, in one application, the image processing module 110 fills holes in an input image with pixels that estimate the actual appearance of the missing or occluded portions of the image. Thus, in the hole-filling application, the energy function is defined such that the enhanced output image will have the holes filled in a manner that is appears visually realistic and estimates the actual appearance of the missing or occluded portions of the image. In another application, the image processing module 110 generates a super-resolved output image that accurately represents the low resolution input image. Thus, in the super-resolution application, the energy function is defined such that the enhanced output image will be a high resolution image that is visually consistent with the low resolution input image. Example processes for hole-filling and super-resolution image enhancement are described in further detail below with reference to FIGS. 3-8.

Hole Filling

An image of an object (e.g., a building) or scene may contain one or more "holes." As used herein, a hole is a region of pixels of the image that meet a certain set of conditions. For example, in one embodiment, a brightness thresholding technique may be used to detect holes where pixels are compared against a threshold and pixels having brightness values below the threshold are deemed hole pixels. In one embodiment, the threshold is set such that only pixels having zero brightness are deemed hole pixels (e.g., (0, 0, 0) in a RGB color space). Generally, a region meets these conditions when the region's visual appearance does not accurately reflect the true appearance of the object or scene. For example, in one embodiment, a hole may appear in areas where the object is partially occluded. Generally, a hole appears as a dark region in an image.

An original image may be enhanced by replacing a region of pixels corresponding to a hole with other pixels that better estimate the true appearance of the object. Ideally, hole-filling should be done in a way that looks plausible to a human viewer. The filled regions should appear seamless at boundaries and should visually match the appearance of the rest of the image. Thus, in one embodiment, the image processing module 110 generates an output image that appears identical or similar to the input image in the non-hole regions, and includes synthesized pixels that fill the holes and estimate the actual appearance of the object in the image in a manner that appears visually realistic to a human viewer.

Figure 3:
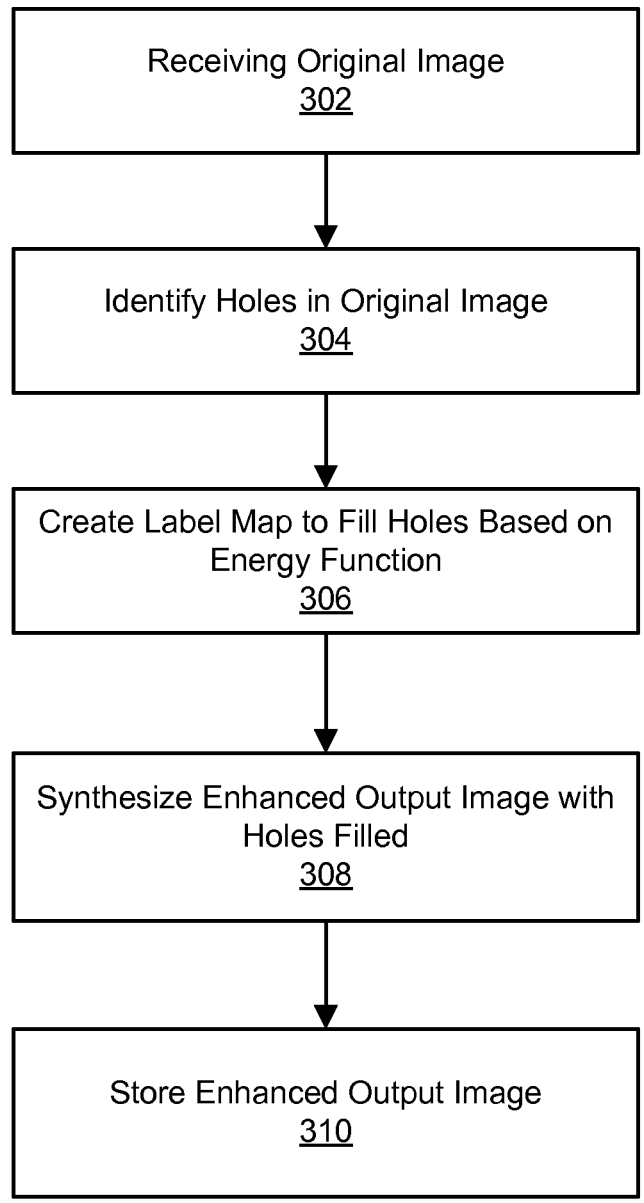
FIG. 3 is a flowchart illustrating a process for enhancing an image via hole-filling according to one embodiment.

FIG. 3 illustrates an embodiment of a hole-filling process for generating a enhanced output image based on an original input image. The image processing module 110 receives 302 the original image/with one or more holes for filling. The image processing module 110 then identifies 304 holes in the original input image (e.g., by the locations of the pixels that form the hole). For example in one embodiment, the image processing module 110 identifies, for each pixel I(x,y) in the original image I, whether or not the pixel is located within a hole region of the image. In one embodiment, the image processing module 110 creates and stores a hole mask identifying the locations of the hole(s). For example, the hole mask may comprise a two-dimensional array with each element in the array corresponding to a pixel and storing a binary value indicating whether or not the corresponding pixel is a hole pixel. The image processing module 110 then creates 306 a label map that maps each pixel location in an output image to a pixel location in the original, choosing the labels such that an energy function is minimized. The enhanced output image is then synthesized 308 by copying the pixels from the original image to the output image according to the labels. The enhanced output image is then stored 310 to a storage medium (e.g., image database 120).

Figure 4:
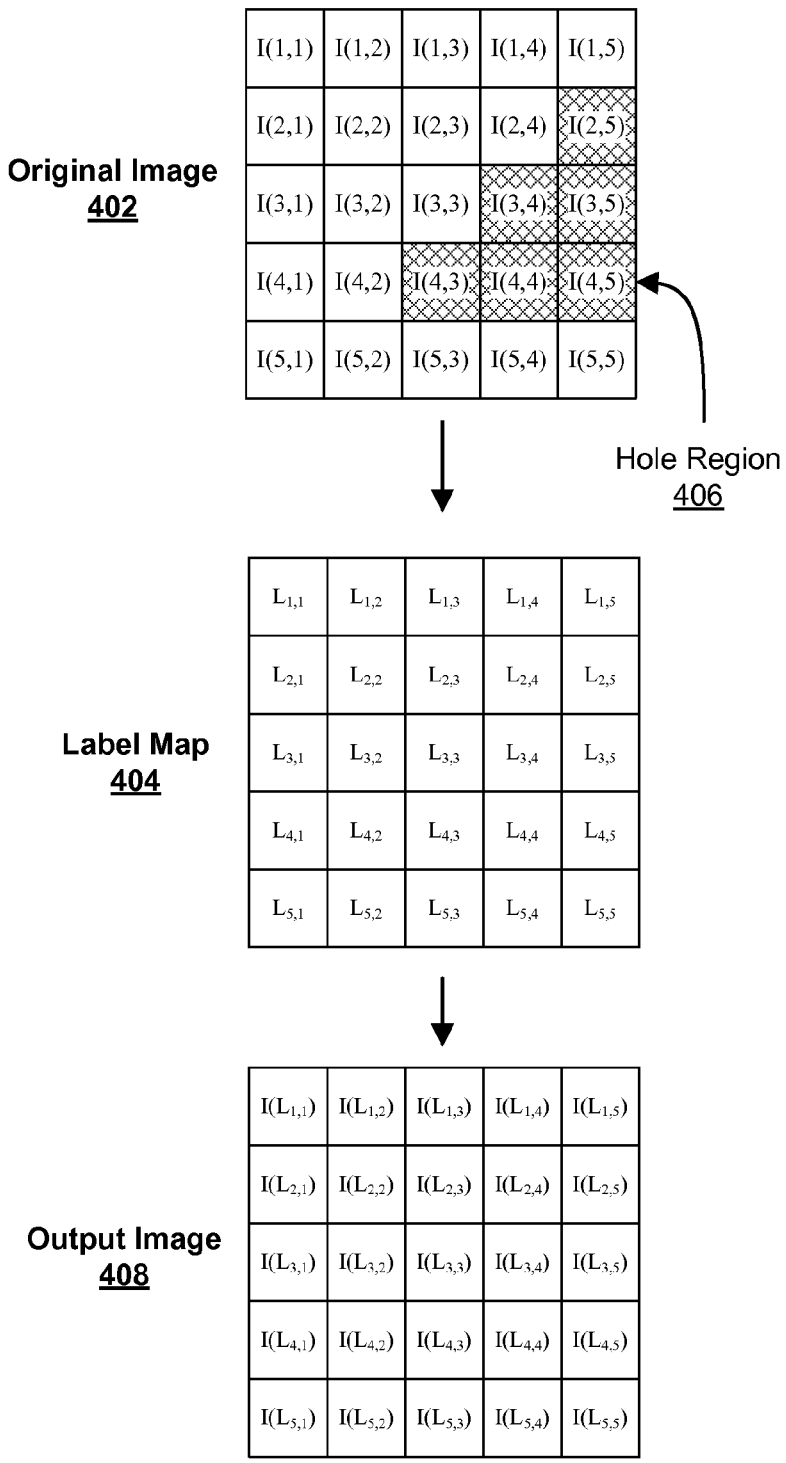
FIG. 4 is a diagram illustrating a hole-filling process for an example image, according to one embodiment.

FIG. 4 illustrates a visual representation of the hole-filling process described above for an example 5×5 image. The original image 402 comprises a 5×5 array of pixels with each pixel given by I(x,y). A hole region 406 is identified in FIG. 4 by the shaded pixels (e.g., including pixels I(2,5), I(3,4), I(3,5), I(4,3), I(4,4), I(4,5)). The image processing module 110 generates the label map 404. The label map 404 in this example is a 5×5 array with each array element comprising a label $L_{a,b}$=(x, y) that maps the position (a, b) in the output image to a location (x, y) in the original image I such that an energy function of the label map 404 is minimized. The output image 408 is synthesized by copying pixels from the original image based on the label map. Thus, an output pixel located at (a, b) of the output image 408 is given by I'($L_{a,b}$)=I(x,y).

In one embodiment, the energy function is configured to ensure that labels for non-hole pixel locations map to the same location, e.g., $L_p$=p where p is a location of a non-hole pixel. Thus, non-hole pixels in the output image are copied directly from the corresponding pixel position in the input image, e.g., I'(p)=I(p) where I'(p) is a pixel in the output image at a position p and I(p) is a non-hole pixel in the input image at the position p. Furthermore, the energy function is generally configured such that hole pixel locations will map to a non-hole location. Thus, hole locations in the output image are filled by copying pixels from non-hole locations in the original image. Furthermore, the specific pixels chosen to fill hole locations in the output image are selected to optimize the smoothness of the visual appearance of output image.

In one embodiment, an energy function E having the above described characteristics for a label map L is defined as:

$$E(L) = \sum_p DC(L_p) + \sum_{p,q} SC(L_p, L_q) \quad (1)$$

where $L_p$ is a label for a pixel position p, $L_q$ is a label for a pixel position q that is in the neighborhood of p, DC is a data cost, and SC is a smoothness cost.

The data cost component $$\sum_p DC(L_p)$$

of the energy function sums data costs (DC) over all labels $L_p$ in the label map. The data cost (DC) for a particular label $L_p$ is calculated as follows:

$$DC(L_p) = \begin{cases} 0 \text{ if } L_p \text{ points to a "valid" location (not a hole and within image boundaries)} \\ \infty \text{ if } L_p \text{ points to a hole location} \end{cases} \quad (2)$$

Thus, the data cost is zero (or other predefined minimum value) if $L_p$ points to a valid location, or otherwise infinite (or other predefined maximum value). In this context, a "valid" pixel location refers to a location that is within the boundary of the original image and is not a hole location. Thus, the data cost component will be zero only if all labels in the label map are valid, and will otherwise be infinite. In this way, minimizing the energy function will force all labels to be valid.

The smoothness cost component $$\sum_{p,q} SC(L(p), L(q))$$

of the energy function sums smoothness cost (SC) over all pairs of "neighboring" labels in the label map (i.e., labels $L_p$ and $L_q$ contribute to the smoothness cost only if p and q are neighbors). The set of pixels that are included in the neighborhood of a given pixel may vary with different implementations. For example, in one embodiment, the neighborhood of a given pixel comprises the four pixels spatially located directly to the left, to the right, above, and below the given pixel. In another embodiment, the neighborhood may also include pixels directly diagonal to the given pixel (eight neighboring pixels). In yet other embodiments, a larger radius may define the neighborhood (e.g., a two pixel or three pixel radius).

The smoothness cost measures the "seamlessness" (or lack of it) of the labeling across two neighboring positions p and q. In one embodiment, the smoothness cost (SC) is calculated as follows:

$$SC(L_p, L_q) = |I(L_p) - I(L_q + p - q)| + |I(L_p + q - p)| \quad (3)$$

where I is the original image and p and q are neighboring positions.

Figure 5:
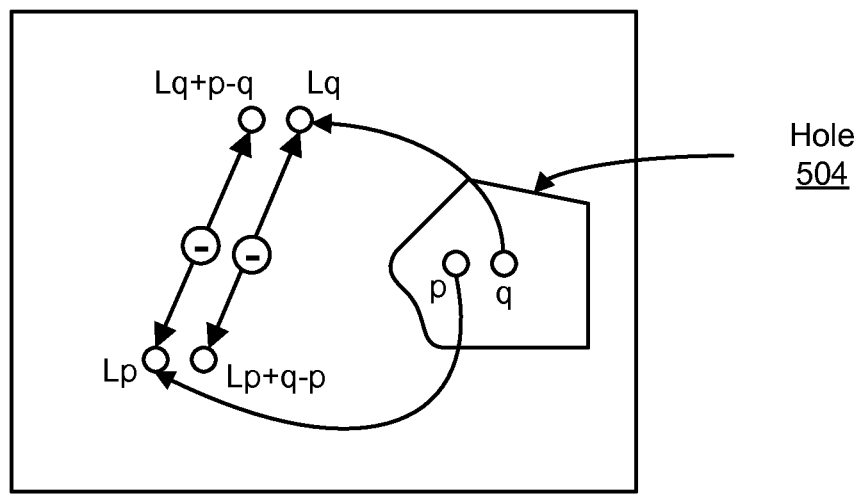
FIG. 5 is a diagram illustrating a technique for determining a smoothness cost according to one embodiment.

This principle behind the smoothness cost is described with reference to FIG. 5. The figure illustrates an image 502 having a hole 504. The hole 504 includes a pixel at a position p and a pixel at a neighboring position q. Thus, p and q are spatial neighbors. Pixel position p has a label $L_p$ and pixel position q has a label $L_q$. A good assumption is that if $L_q$ is a label for q, a label for p that will provide good smoothness is $L_q + p - q$, because this pixel position is the same distance and direction away from $L_p$ as position p is from q. Thus, the first component of the smoothness cost $|I(L_p) - I(L_q + p - q)|$ represents the difference between the pixel at the actual position $L_p$ and the pixel at the position $L_q + p - q$ (assumed to provide good smoothness). Similarly, a good assumption is that if $L_p$ is a label for p, a label for q that will provide good smoothness is $L_p + q - p$, because this pixel position is the same distance and direction away from $L_q$ as position q is from p. Thus, the second component of the smoothness cost $|I(L_q) - I(L_p + q - p)|$ represents the difference between the pixel at the actual position $L_q$ and the pixel at the position $L_p + q - p$ (assumed to provide good smoothness). The first and second components of the smoothness cost are summed to provide an overall smoothness cost for the pixel position pair p, q.

In one embodiment, the process of generating the label map can be performed efficiently using an iterative approach. In this approach, the label map is first initialized using a set of initial labels. The initial labels may be assigned according to a random process, according to predefined values (e.g., each position mapping to itself), or according to multi-scale process that is described in further detail below. Once all pixel positions are initialized with an initial label, the image processing module 110 then iteratively refines the labels by finding new labels that further minimize the energy function. For example, in one embodiment, the image processing module 110 refines the labels by processing each pixel position one at a time (e.g., in a raster scan order). In the refinement steps, the image processing module 110 first determines a set of candidate labels S[p] for the pixel position p. Then, the image processing module 110 selects the candidate label that will best minimize the energy function.

Candidate Label Selection

In one embodiment, candidate labels can be determined using either a randomization technique (i.e., randomized candidates), a coherence technique (i.e. coherence candidates), or both. The candidate label selection module 206 selects randomized candidates according to a function having some random component. For example, in one embodiment, the candidate label selection module 206 selects a random set of "valid" pixel locations within a radius of the position referenced by the current label $L_p$. The radius and/or number of candidates may be predefined constants. In another embodiment, a weighted randomized function may be used that weights likelihoods of selecting a particular pixel location based on distance. Thus, for example, pixel positions closer to the position pointed to by the current label $L_p$ may be more likely to be selected than pixels positions farther away. These randomized candidates are included in the candidate set S[p].

To find coherence candidates, the candidate label selection module 206 generates candidate labels based on labels assigned to neighboring positions to the position p. This process selects candidates that are likely to minimize smoothness cost. For example, in one embodiment, a coherence candidate $Lc_p$ for a pixel position p is determined based on the label for a neighboring pixel position q as $Lc = L_q + p - q$ (if Lc is not a hole pixel position and is within the image boundaries). A set of coherence candidates is found by determining a coherence candidate from each neighboring pixel q. Valid coherence labels are included in the candidate set S[p] together with the randomized labels.

The energy minimization module 208 then determines which of the candidate labels S[p] will minimize the energy function. In one embodiment, the image processing module 110 performs a fixed number of iterations (e.g., 5-10 iterations) with each iteration seeking to further improve the energy function. Alternatively, the image processing module 110 may continue iterating until a particular criterion is met (e.g., the energy cost falls below a threshold or the incremental improvement in energy cost falls below a threshold).

Multi-Scale Energy Minimization

Figure 6A:
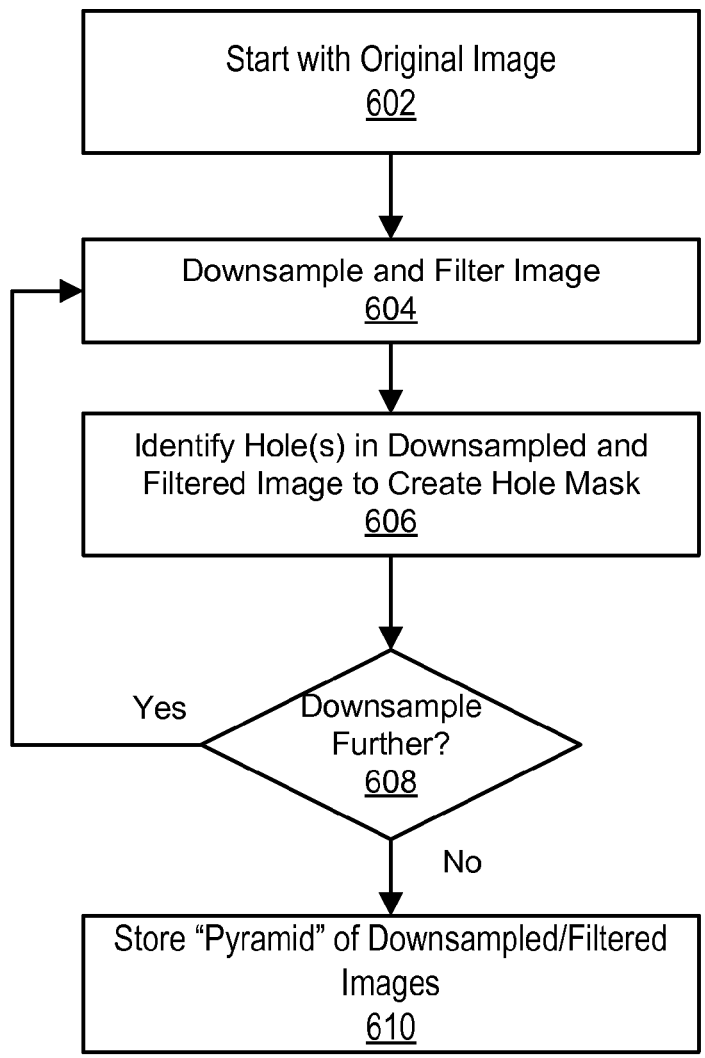
FIG. 6A is a flowchart illustrating a downsampling phase of a multi-scale energy minimization process according to one embodiment.
Figure 6B:
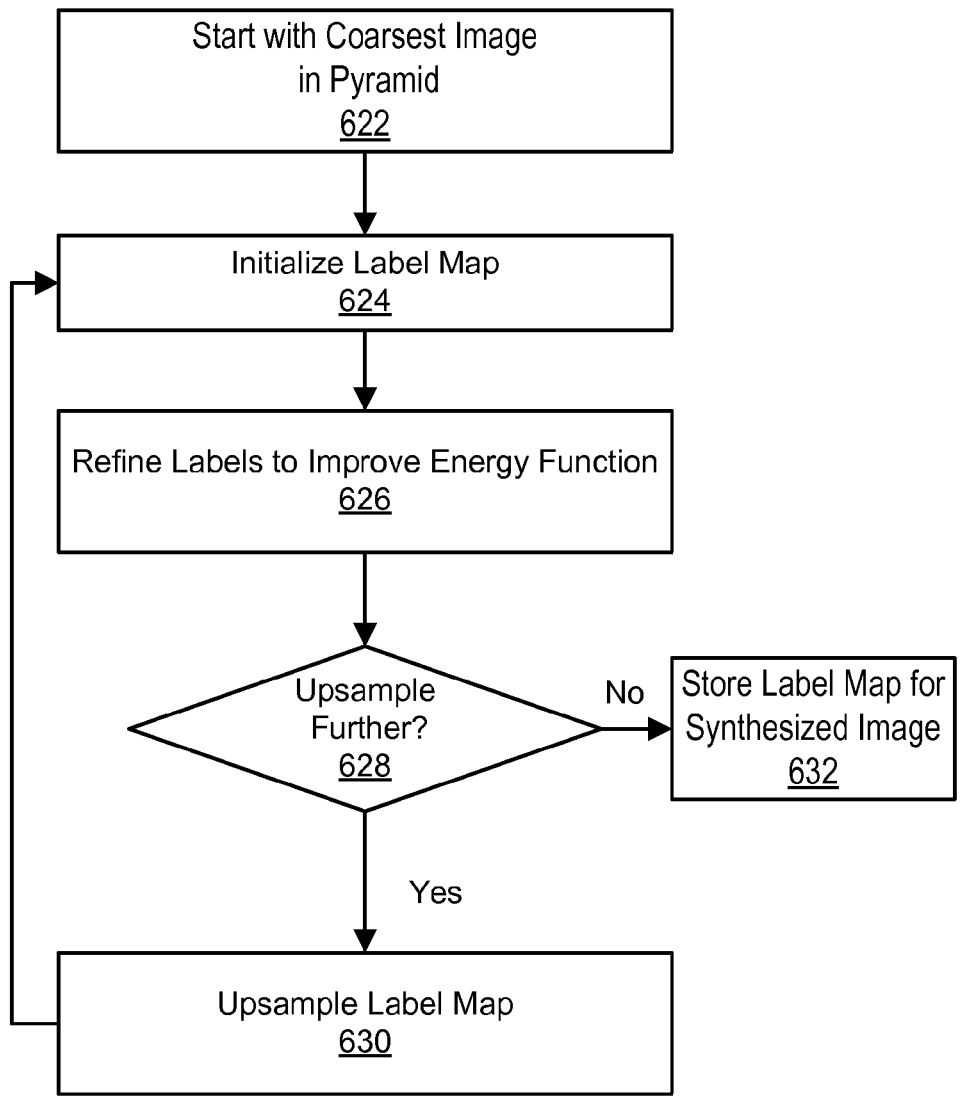
FIG. 6B is a flowchart illustrating an upsampling phase of a multi-scale energy minimization process according to one embodiment.

FIGS. 6A and 6B are flowcharts illustrating an embodiment of a process for creating the label map using a multi-scale implementation to initialize the labels. FIG. 6A illustrates a downsampling, or pre-processing, phase of the multi-scale process. In the downsampling phase, the image processing module 110 progressively downsamples (via the downsampling module 202) and filters the original image to create a "pyramid" of downsampled/filtered images of varying resolution. The downsampling phase starts 602 with the original image. The image processing module 110 downsamples and filters 604 the image. In one embodiment, downsampling comprises removing selected pixels from the image depending on the downsampling factor. For example, to downsample by a factor of two, the image processing module 110 removes every second row and column of the image. In alternative embodiments, a different downsampling factor may be used. Filtering is applied to smooth the pixels that still remain after downsampling. In one embodiment, each pixel in the downsampled image is assigned a value that is an average of the corresponding pixel in the pre-downsampled image and its "neighboring" pixels in the pre-downsampled image, with the exception of hole pixels which are excluded from the average. If the corresponding pixel in the pre-downsampled image and its neighboring pixels are all hole pixels, the downsampled pixel may be assigned a predefined value (e.g., 0) that indicates that the downsampled pixel is also a hole pixel. The set of neighboring pixels may be defined in different ways according to different embodiments and is not necessarily defined in the same way as the neighborhood used to calculate the smoothness cost discussed above. For example, in one embodiment, the neighboring pixels of a given pixel include pixels directly above, below, to the left and to the right of the given pixel (if within the boundaries of the image and not a hole pixel). In another embodiment, the neighboring pixels may also include pixels directly diagonal from a given pixel. In yet other embodiment, neighboring pixels may include pixels not directly adjacent to a given pixel (e.g., within a two or three pixel radius). By excluding hole pixels from the averaged pixels used in the downsampled image, the hole will shrink around its edges each downsampling/filtering iteration. After downsampling and filtering, hole pixels will remain only where the corresponding pre-downsampled pixel and all of its neighboring pixels are hole pixels.

After downsampling and filtering the image, the image processing module 110 identifies 606 the hole(s) still remaining in the downsampled image. A new hole mask is created that identifies the location of the hole(s) in the downsampled image. The image processing module 110 then determines 608 whether to downsample further. This may be determined, for example, based on a stopping criterion such as the downsampled image reaching a particular size. In one embodiment, the image processing module 110 continues downsampling until the image size reaches a single pixel. If the image processing module 110 determines to downsample further, the process loops back to step 604 and iterates again. If the image processing module 110 determines to stop downsampling (e.g., when the image is dowsampled to a single pixel), then the image processing module 110 stores the "pyramid" 610 of successively downsampled and filtered images (each having a different resolution) and corresponding hole masks.

FIG. 6B, illustrates an embodiment of an upsampling phase of the multiscale process. In this phase, the image processing module 110 generates a series of label maps from each of the downsampled images in the downsampling pyramid by progressively upsampling (via the upsampling module 204) the label maps. For example, in one embodiment, the image processing module 110 starts 622 with the coarsest image in the pyramid of downsampled images. In one embodiment, this coarsest image may comprise only a single pixel. The image processing module initializes 624 a label map having dimensions equivalent to the dimensions of the coarsest image. If the coarsest image is only a single pixel, this step 624 is trivial as the label map comprises only a single label and the pixel location is initialized to itself, i.e., $L_p$=p. In subsequent stages, initial labels are determined based on the label map for the previous lower resolution image in the downsampling pyramid. For example, in one embodiment, labels for the previous low resolution image map are first scaled based on the upsampling factor to generate labels for the higher resolution label map. For example, assuming an upsampling factor of 2, labels for pixel positions having even row and columns in the higher resolution label map are first initialized as:

$$\text{High Res\_}L(2p)=2*\text{Low Res\_}L(p) \quad (4)$$

where HighRes_L is the label map currently being initialized and LowRes_L is the lower resolution label map created in the previous iteration of the multi-scale process.

Then, the remaining positions added during upsampling (having an odd row and/or column) in the high resolution map are initialized with labels pointing to adjacent positions such that the labels are initialized in patches. Thus, for example, in one embodiment, a label is initialized as:

$$\text{High Res\_}L(2p+\text{offset})=2*\text{Low Res\_}L(p)+\text{offset} \quad (5)$$

for offset values of (0,1), (1,0), or (1,1). Using the initialization equations above, some labels may initialize to invalid pixel locations (e.g., pixel locations that are holes or outside the image boundaries). To prevent this, labels that would be initialized to an invalid position may instead be projected to a valid pixel location (e.g., the closest valid location). The equations above may be modified for different upsampling factors.

After initialization, the image processing module 110 then refines 626 the labels as described above in order to improve the energy function (e.g., by generating a set of candidate labels for each pixel position and selecting the candidate label that best minimizes the energy function). As described above, the refinement step 626 may iterate multiple times at each stage of the pyramid.

The image processing module 110 then determines 628 whether or not to upsample further by, for example, checking if a stopping criterion is met. For example, in one embodiment, the stopping criterion is met when the label map reaches a size equal to the original image size. If the image processing module 110 determines to upsample further, the label map is upsampled 630 to create a new label map having dimensions equivalent to the dimensions of the next largest image in the pyramid. If the image processing module 110 determines not to upsample further (e.g., because the original image size is reached), the image processing module 110 stores 632 a label map having the same dimensions as the original image. The image generation module 210 may then use this label map to synthesize the output image as described above.

Figure 7:
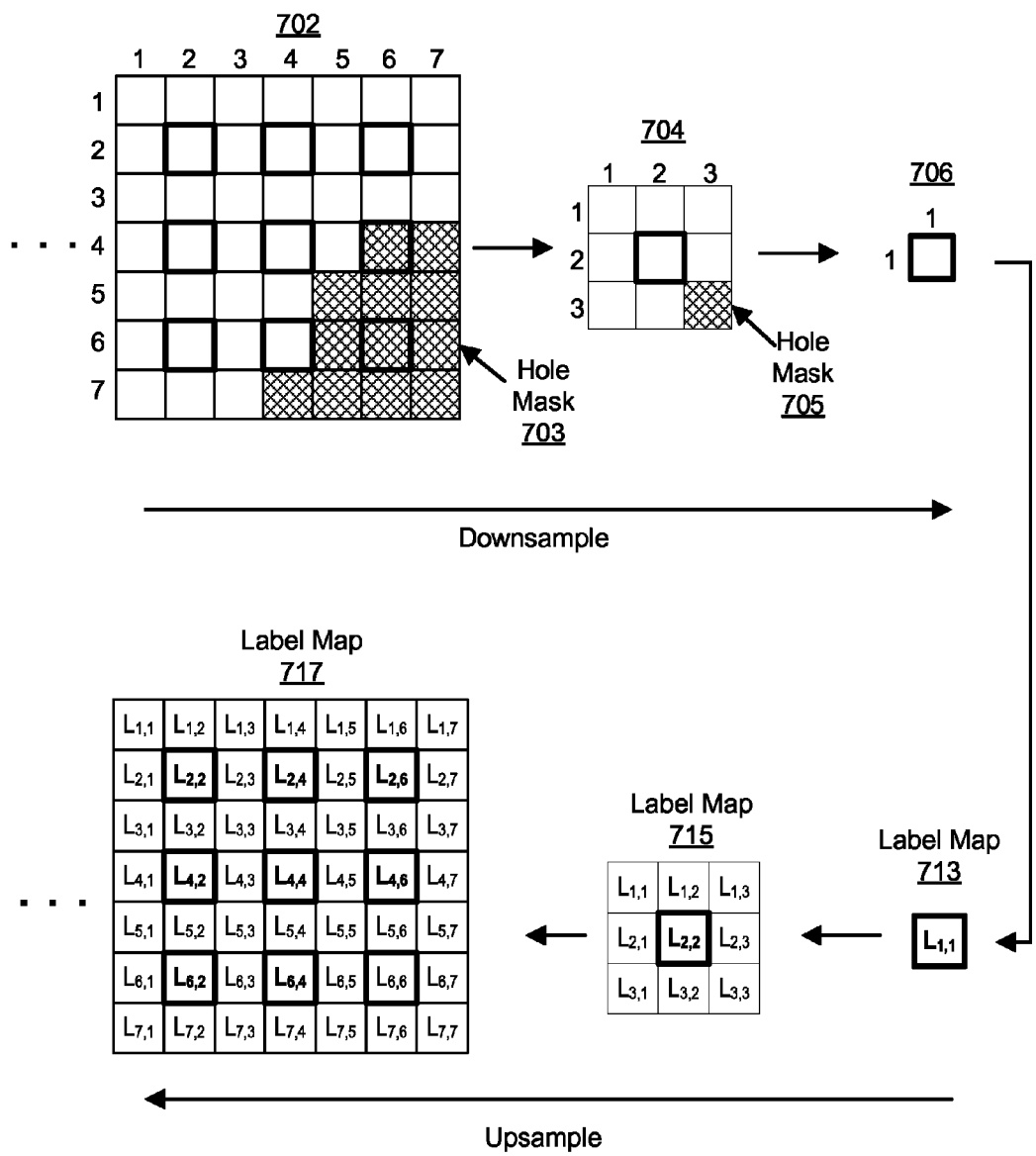
FIG. 7 is a diagram illustrating a set of example images and corresponding label maps enhanced via hole-filling according to one embodiment.

FIG. 7 illustrates several example stages of the multi-scale process described in FIGS. 6A-6B. Specifically, FIG. 7 illustrates the last three iterations of the downsampling phase of FIG. 6A and the first three iterations of the upsampling phase of FIG. 6B. The downsampled image 702 comprises a 7×7 array of pixels with hole pixels indicated by the shaded portion 703 (i.e., the hole mask). The image 702 is downsampled by removing the odd rows and columns, thus leaving only the pixels outlined in bold. This results in the 3×3 image 704. For a given pixel in image 704, the pixel value is set by computing an average of the corresponding pixel in image 702 and its neighboring pixels, with the neighborhood being defined in this example as a one pixel radius (including diagonal pixels, excluding hole pixels or positions outside the image boundary. Thus, the hole mask 705 is smaller in image 704 as a result of this averaging technique because the hole remains only where a pixel and all of its neighboring pixels are holes. The image 704 is then downsampled and filtered again, resulting in the single pixel 706.

In the upsampling phase, a label map 713 is first generated corresponding to image 706. Because the label map 713 at this stage is 1×1, this step is trivial and the label maps the pixel to itself, i.e., $L_{1,1}$=(1,1). Next the label map 713 is upsampled to the size of image 704. A label is then generated corresponding to each pixel. In one embodiment, where labels are selected to minimize the energy function of equation (1) above, non-hole pixels are mapped to corresponding locations in the image 704. Thus, for example, $L_{1,1}$=(1,1), $L_{1,2}$=(1,2), and so on. Furthermore, hole pixels are mapped to non-hole locations. Thus, for example, $L_{3,3}$ cannot map to (3,3) because this is a hole location, and instead be mapped to any other pixel location as determined by the energy applying the energy function. The label map 715 is then upsampled again and new labels are generated to generate the label map 717. This process continues until a label map of the original image size is reached.

In one embodiment, the image processing module 110 can improve efficiency by imposing a hard constraint that ensures the data cost is always zero. For example, when generating the label map for a given stage of the multiscale process, the image processing module 110 pre-processes the label map to set labels for non-hole pixel positions equal to the pixel position, i.e., $L_p=p$ for a non-hole position p. Then, the image processing module processes only the hole pixels (e.g., in a raster scan order) to find labels that will minimize smoothness cost. The data cost need not be explicitly calculated because the data cost is already ensured to be zero by setting labels for non-hole positions as $L_p=p$ and by allowing only valid pixel locations in the candidate set S[p] when selecting labels for hole pixel positions. Thus, during each iteration the image processing module 110 only calculates smoothness cost for hole pixel positions and only performs the iterative refinement process on these pixel positions. Furthermore, because the smoothness cost component of the energy function is a summation, choosing a candidate label for each pixel location that minimizes smoothness cost will decrease the overall smoothness cost component of the energy function.

A benefit of the multi-scale process described process is that the energy function need not be explicitly computed for all possible combinations of labels. Unlike some traditional texture-mapping techniques, the above described implementation does not necessarily perform an explicit "nearest neighbor search." Rather, each stage just determines a label map that best improves the previous labeling in terms of smoothness while satisfying boundary constraints. While this is a greedy approach, the use of a multi-scale pyramid alleviates the problem by taking long-range interactions into account at the coarser level.

In alternative embodiments, extensions may be used to make the algorithm less greedy. For example, in one alternative embodiment the image processing module 110 pre-processes the labels into contiguous chunks/regions that have the same label. The algorithm then proceeds at region level, updating the label for "all" pixels within a region at once. The cost for a region is computed by summing the costs for all pixels within that region. In the case of hole filling, where it is the smoothness cost that matters, the image processing module 110 only computes the smoothness cost at the boundary pixels for that region, and measures whether consistency with respect to the neighboring regions is increased or decreased by the candidate label. The candidate set is constructed by looking at labels for all neighboring regions.

Another alternative embodiment uses the multi-scale pyramid to modify the data cost by providing a low-resolution soft constraint, similar to that described below in the context of super-resolution image enhancement. This approach can require that the synthesized image at the finer pyramid level, when filtered and downsampled, match the coarser synthesized image.

Super-Resolution

In super-resolution, the goal is to enhance a low resolution image by synthesizing a high resolution enhanced version of the image as output. A particular formulation of this problem assumes that other high resolution images of the same object or scene are available as input images. These high resolution input images may be taken from different perspectives than the low resolution image being enhanced or may include only a portion of the object or scene. Thus, super-resolution synthesizes a high-resolution version of a low-resolution image based on one or more high-resolution input images.

As with the hole-filling problem discussed above, the super-resolution problem can be cast as a labeling problem by determining a label map for an output image that minimizes an energy function, and constructing the output image according to the labels. The labels map a pixel position in the output image to a pixel position in one of the high-resolution input images. Thus, super-resolution image enhancement may be implemented similarly to hole-filling described above with several differences discussed in the description below.

Figure 8:
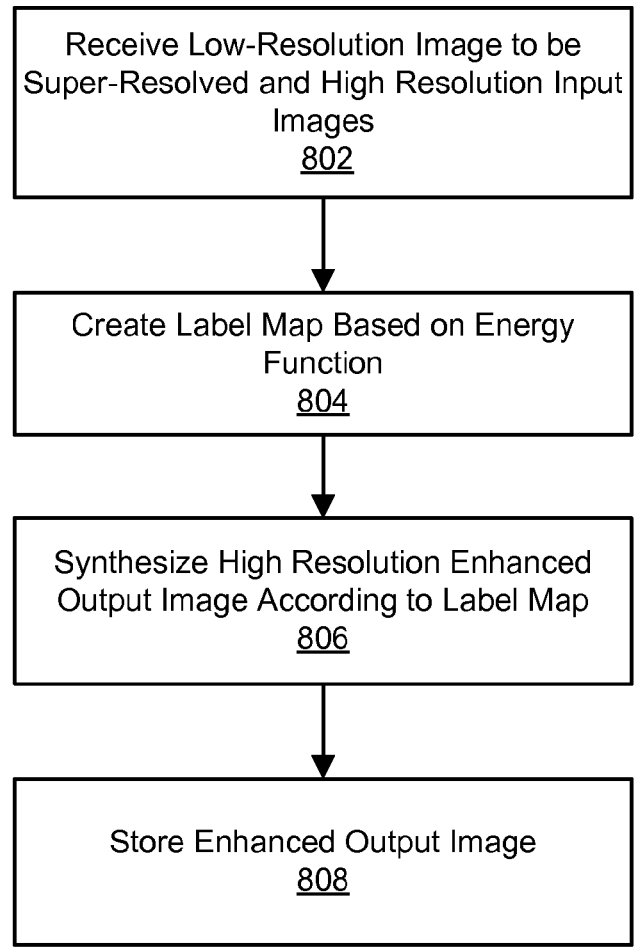
FIG. 8 is a flowchart illustrating a process for image enhancement via super-resolution according to one embodiment.

FIG. 8 illustrates an example embodiment of a process for generating a super-resolved image. The image processing module 110 receives 802 a low resolution image $I_{LR}$ to be super-resolved and one or more high-resolution input images $I_1 \ldots I_n$. The image processing module 110 then creates 804 a label map, with each position in the label map corresponding to a pixel position in the super-resolved output image. Each label points to a pixel position in one of the high-resolution input images. Thus, instead of a two-dimension label, a three-dimensional label is used that identifies both a position and an index corresponding to one of the high-resolution input images, i.e., $L_{a,b}=(i, x, y)$ where is an index indentifying one the high-resolution input images. The labels are chosen to minimize an energy function. In one embodiment, the overall energy function described above in Eq. (1) and the smoothness cost described in Eq. (3) are used, but the data cost (DC) is defined differently. For example, in one embodiment, the data cost (DC) for a label $L_p$ is given by:

$$DC(L_p)=|I_C(L_p)-I_{LR}(p)| \quad (6)$$

where $I_{LR}$ is the low-resolution image being super-resolved and $I_c$ is a coarse-scale (i.e., downsampled) version of the high resolution input image I referenced in label $L_p$. This coarse-scale image $I_C$ has a resolution that matches the resolution of the low-resolution image $I_{LR}$. Thus, the overall data cost represents a difference in pixel values (e.g., color) between the original low resolution image being super-resolved and a downsampled version of the output image. This data cost is effective because it may be reasonably assumed that a good super-resolved image, when downsampled, will match the original image very closely.

The image processing module 110 then synthesizes 806 the super-resolved output image by copying pixels from the high-resolution input images to the proper locations in the output image based on the labels. This process is similar to the process illustrated in FIG. 4 described above, except that the labels are now three-dimensional and may come from different input images.

As with the hole filling application described above, the process of generating the label map for super-resolution can be performed efficiently using an iterative approach. Here, the label map is first initialized using a set of initial labels and in subsequent iterations, the labels are then refined to further minimize the energy function. Initialization may be implemented using a multi-scale process similar to that described above. However, unlike hole-filling, the downsampling phase for super-resolution does not need to consider the locations of holes (i.e., no pixels are hole pixels). Furthermore, in super-resolution, the image processing module 110 may utilize an expanded set of candidate labels in addition to those described above for hole-filing. Thus, in one embodiment, the set of coherence candidates is expanded to include both spatial coherence candidates (as described above) and "signal coherence" candidates. To find signal coherence candidates, the image processing module 110 may first pre-process the low resolution image $I_{LR}$ to identify pixels having similar pixel values (e.g., colors intensities) or gradients. Pixels that fall within a certain threshold similarity of each other are identified as "signal neighbors." Thus, each pixel now has both a set of spatial neighbors (pixels that are spatially close) and a set of signal neighbors (pixels that are qualitatively similar). Alternatively, a gradient comparison can be used to identify signal neighbors. In one embodiment, the image processing module 110 determines signal neighbors by binning the colors and gradients into a histogram and considering all pixels in the same bin to be neighbors. Then, when determining coherence candidates, the image processing module 110 considers both spatial neighbors and signal neighbors, i.e., a coherence candidate label $L_{Cp}$ for a pixel position p is given by $L_C=L_q+p-q$ where p and q are either spatial neighbors or coherence neighbors.

Computer Architecture

Figure 9:
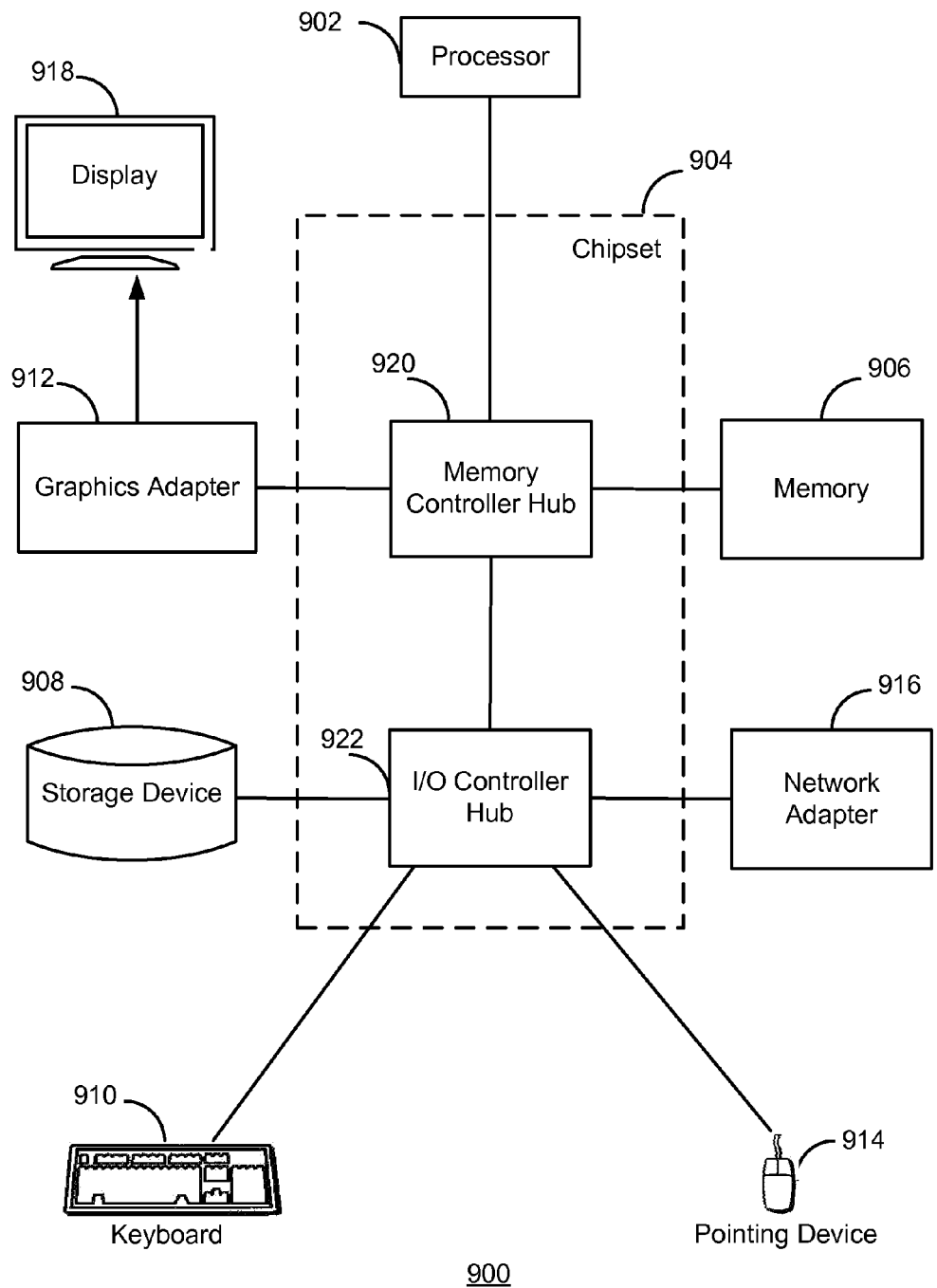
FIG. 9 is a computer for use as the image processing server according to one embodiment.

FIG. 9 is a high-level block diagram illustrating an example of a computer 900 for use as an image processing server 100. Illustrated are at least one processor 902 coupled to a chipset 904. The chipset 904 includes a memory controller hub 920 and an input/output (I/O) controller hub 922. A memory 906 and a graphics adapter 912 are coupled to the memory controller hub 920, and a display device 918 is coupled to the graphics adapter 912. A storage device 908, keyboard 910, pointing device 914, and network adapter 916 are coupled to the I/O controller hub 922. Other embodiments of the computer 900 have different architectures. For example, the memory 906 is directly coupled to the processor 902 in some embodiments.

The storage device 908 is a non-transitory computer-readable storage medium such as a hard drive, compact disk read-only memory (CD-ROM), DVD, or a solid-state memory device. The memory 906 holds instructions and data used by the processor 902. The pointing device 914 is a mouse, track ball, or other type of pointing device, and is used in combination with the keyboard 910 to input data into the computer 900. The graphics adapter 912 displays images and other information on the display device 918. The network adapter 916 couples the computer 900 to a network. Some embodiments of the computer 900 have different and/or other components than those shown in FIG. 9. The types of computer 900 can vary depending upon the embodiment and the desired processing power. The computer 900 may comprise multiple blade servers working together to provide the functionality described herein.

The computer 900 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 908, loaded into the memory 906, and executed by the processor 902.

The above description is included to illustrate the operation of the embodiments and is not meant to limit the scope of the invention. From the above discussion, many variations will be apparent to one skilled in the relevant art that would yet be encompassed by the spirit and scope of the invention.

The invention claimed is:

1. A computer-implemented method for enhancing an image, the method comprising:
   generating a low resolution version of one or more input images;
   generating a low resolution label map corresponding to the low resolution versions of the one or more input images, each label in the low resolution label map corresponding to an output pixel position and each label pointing to a pixel position in the low resolution version of the one or more input images;
   initializing an output label map corresponding to a high resolution output image using initial labels determined based on the low resolution label map;
   refining the output label map to minimize an energy function;
   generating the high resolution output image by copying pixels from the one or more input images according to the output label map; and
   storing the high resolution output image to a storage medium.

2. The computer-implemented method of claim 1, wherein the one or more input images comprise hole pixels, the hole pixels representing an occluded or missing portion of an object depicted in the one or more input images, and wherein initializing the output label map comprises determining labels such that the output image lacks the hole pixels.

3. The computer-implemented method claim 2, wherein the energy function comprises a data cost component set to a predefined maximum value if any of the labels in the output label map point to invalid pixel positions, and the data cost component is set to a predefined minimum value if all of the labels in the output label map point to valid pixel positions, wherein the valid pixel positions are within boundaries of the one or more input images and are not hole pixels.

4. The computer-implemented method of claim 1, wherein the one or more input images comprise one or more high resolution input images depicting an object, and the one or more input images comprise a low resolution input image depicting the object, and wherein the output image comprises a high resolution version of the low resolution input image.

5. The computer-implemented method claim 4, wherein the energy function comprises a data cost component representing a difference in pixel values between a low resolution version of the output image and the low resolution input image.

6. The computer-implemented method of claim 1, wherein the energy function comprises a smoothness cost component representing a smoothness measure between neighboring pixels in the output image.

7. The computer-implemented method of claim 1, wherein refining the output label map to minimize the energy function comprises:
   determining, for a given pixel position in the output label map, a set of candidate labels for the given pixel position;
   determining, for each candidate label in the set of candidate labels, a contribution to the energy function; and
   selecting the candidate label for the given pixel position that will best minimize the energy function.

8. The computer-implemented method of claim 7, wherein determining the set of candidate labels comprises:
   determining randomized candidate labels selected according to a function having a random component.

9. The computer-implemented method of claim 7, wherein determining the set of candidate labels comprises:
   determining spatial coherence candidate labels selected based on labels assigned to spatial neighbors of the given pixel position.

10. The computer-implemented method of claim 7, wherein determining the set of candidate labels comprises:
    determining signal coherence candidate labels selected based on labels assigned to signal neighbors of the given pixel position, wherein the signal neighbors comprise pixels within a threshold similarity to the given pixel.

11. The computer-implemented method of claim 1, wherein initializing the output label map using the initial labels comprises:
  upsampling a low resolution label map corresponding to the low resolution version of the one or more input images.

12. The computer-implemented method of claim 1, further comprising:
  pre-processing the one or more input images to generate a plurality of downsampled images of varying resolutions including the low resolution version of the one or more input images, wherein a coarsest downsampled image comprises a single pixel.

13. The computer-implemented method of claim 1, wherein the one or more input images comprises a single input image and wherein each label in the low resolution label map points to a pixel position in a low resolution version of the single input image.

14. The computer-implemented method of claim 1, wherein the one or more input images comprises a plurality of input images and wherein two different labels in the low resolution label map point to pixel positions in low resolution versions of at least two different ones of the plurality of input images.

15. A non-transitory computer-readable storage medium storing executable computer program instructions for enhancing an image, the computer program instructions comprising instructions for:
  generating a low resolution version of one or more input images;
  generating a low resolution label map corresponding to the low resolution versions of the one or more input images, each label in the low resolution label map corresponding to an output pixel position and each label pointing to a pixel position in the low resolution version of the one or more input images;
  initializing an output label map corresponding to a high resolution output image using initial labels determined based on the low resolution label map;
  refining the output label map to minimize an energy function;
  generating the high resolution output image by copying pixels from the one or more input images according to the output label map; and
  storing the high resolution output image to a storage medium.

16. The computer-readable storage medium of claim 15, wherein the one or more input images comprise hole pixels, the hole pixels representing an occluded or missing portion of an object depicted in the one or more input images, and wherein initializing the output label map comprises determining labels such that the output image lacks the hole pixels.

17. The computer-readable storage medium of claim 16, wherein the energy function comprises a data cost component set to a predefined maximum value if any of the labels in the output label map point to invalid pixel positions, and the data cost component is set to a predefined minimum value if all of the labels in the output label map point to valid pixel positions, wherein the valid pixel positions are within boundaries of the one or more input images and are not hole pixels.

18. The computer-readable storage medium of claim 15, wherein the one or more input images comprise one or more high resolution input images depicting an object, and the one or more input images comprise a low resolution input image depicting the object, and wherein the output image comprises a high resolution version of the low resolution input image.

19. The computer-readable storage medium claim 18, wherein the energy function comprises a data cost component representing a difference in pixel values between a low resolution version of the output image and the low resolution input image.

20. The computer-readable storage medium of claim 15, wherein the energy function comprises a smoothness cost component representing a smoothness measure between neighboring pixels in the output image.

21. The computer-readable storage medium of claim 15, wherein refining the output label map to minimize the energy function comprises:
  determining, for a given pixel position in the output label map, a set of candidate labels for the given pixel position;
  determining, for each candidate label in the set of candidate labels, a contribution to the energy function; and
  selecting the candidate label for the given pixel position that will best minimize the energy function.

22. The computer-implemented method of claim 21, wherein determining the set of candidate labels comprises:
  determining randomized candidate labels selected according to a function having a random component.

23. The computer-readable storage medium of claim 21, wherein determining the set of candidate labels comprises:
  determining spatial coherence candidate labels selected based on labels assigned to spatial neighbors of the given pixel position.

24. The computer-readable storage medium of claim 21, wherein determining the set of candidate labels comprises:
  determining signal coherence candidate labels selected based on labels assigned to signal neighbors of the given pixel position, wherein the signal neighbors comprise pixels within a threshold similarity to the given pixel.

25. The computer-readable storage medium of claim 15, wherein initializing the output label map using the initial labels comprises:
  upsampling a low resolution label map corresponding to the low resolution version of the one or more input images.

26. The computer-readable storage medium of claim 15, further comprising:
  pre-processing the one or more input images to generate a plurality of downsampled images of varying resolutions including the low resolution version of the one or more input images, wherein a coarsest downsampled image comprises a single pixel.

27. A computer system for enhancing an image, the computer system comprising:
  a non-transitory computer-readable storage medium storing executable computer program instructions for enhancing video, the computer program instructions comprising instructions for:
    generating a low resolution version of one or more input images;
    generating a low resolution label map corresponding to the low resolution versions of the one or more input images, each label in the low resolution label map corresponding to an output pixel position and each label pointing to a pixel position in the low resolution version of the one or more input images;
    initializing an output label map corresponding to a high resolution output image using initial labels determined based on the low resolution label map;
    refining the output label map to minimize an energy function;

generating the high resolution output image by copying pixels from the one or more input images according to the output label map; and storing the high resolution output image to a storage medium; and a processor configured to execute the computer program instructions stored on the computer-readable storage medium.

28. The computer system of claim 27, wherein the one or more input images comprise hole pixels, the hole pixels representing an occluded or missing portion of an object depicted in the one or more input images, and wherein initializing the output label map comprises determining labels such that the output image lacks the hole pixels.

29. The computer system of claim 28, wherein the energy function comprises a data cost component set to a predefined maximum value if any of the labels in the output label map point to invalid pixel positions, and the data cost component is set to a predefined minimum value if all of the labels in the output label map point to valid pixel positions, wherein the valid pixel positions are within boundaries of the one or more input images and are not hole pixels.

30. The computer system of claim 27, wherein the one or more input images comprise one or more high resolution input images depicting an object, and the one or more input images comprise a low resolution input image depicting the object, and wherein the output image comprises a high resolution version of the low resolution input image.

31. The computer system claim 30, wherein the energy function comprises a data cost component representing a difference in pixel values between a low resolution version of the output image and the low resolution input image.

32. The computer system of claim 30, wherein the energy function comprises a smoothness cost component representing a smoothness measure between neighboring pixels in the output image.

33. The computer system of claim 30, wherein refining the output label map to minimize the energy function comprises:

determining, for a given pixel position in the output label map, a set of candidate labels for the given pixel position;

determining, for each candidate label in the set of candidate labels, a contribution to the energy function; and selecting the candidate label for the given pixel position that will best minimize the energy function.

34. The computer system of claim 33, wherein determining the set of candidate labels comprises:

determining randomized candidate labels selected according to a function having a random component.

35. The computer system of claim 33, wherein determining the set of candidate labels comprises:

determining spatial coherence candidate labels selected based on labels assigned to spatial neighbors of the given pixel position.

36. The computer system of claim 33, wherein determining the set of candidate labels comprises:

determining signal coherence candidate labels selected based on labels assigned to signal neighbors of the given pixel position, wherein the signal neighbors comprise pixels within a threshold similarity to the given pixel.

37. The computer system of claim 27, wherein initializing the output label map using the initial labels comprises:

upsampling a low resolution label map corresponding to the low resolution version of the one or more input images.

38. The computer system of claim 27, further comprising:

pre-processing the one or more input images to generate a plurality of downsampled images of varying resolutions including the low resolution version of the one or more input images, wherein the coarsest downsampled image comprises a single pixel.

* * * * *